July 20, 1937.  C. C. FARMER  2,087,624
FLUID PRESSURE BRAKE
Filed Feb. 19, 1936

INVENTOR
CLYDE C. FARMER
BY Wm. N. Cady
ATTORNEY

Patented July 20, 1937

2,087,624

UNITED STATES PATENT OFFICE 2,087,624

FLUID PRESSURE BRAKE

Clyde C. Farmer, Pittsburgh, Pa., assignor to The Westinghouse Air Brake Company, Wilmerding, Pa., a corporation of Pennsylvania Application February 19, 1936, Serial No. 64,622

24 Claims. (Cl. 303—83)

This invention relates to fluid pressure brake equipment and more particularly to the type adapted to operate upon a reduction in brake pipe pressure to effect an application of the brakes.

In Patent No. 2,031,213, issued to Clyde C. Farmer on February 18, 1936, a brake controlling valve device is disclosed which comprises a service portion adapted to operate upon a service reduction in brake pipe pressure to effect a service application of the brakes, and an emergency portion adapted to operate along with the service portion upon an emergency reduction in brake pipe pressure to effect an emergency application of the brakes.

The emergency portion of the brake controlling valve device comprises a piston subject to the opposing pressures of the brake pipe and a quick action chamber, and further comprises a main slide valve and an auxiliary slide valve mounted on said main slide valve, these slide valves being controlled by said piston.

Upon a reduction in brake pipe pressure, the piston is adapted to first move the auxiliary slide valve relative to the main slide valve to a service position in which a communication is established through which the pressure of fluid in the quick action chamber is adapted to be reduced as fast as brake pipe pressure reduces upon a service reduction so as to thereby prevent further movement of said piston and auxiliary slide valve upon a service reduction in brake pipe pressure. This communication is so restricted however as to prevent quick action chamber pressure reducing as fast as brake pipe pressure reduces upon an emergency reduction, so that upon an emergency reduction in brake pipe pressure, a sufficient differential of pressures is obtained on the piston to move the auxiliary slide valve past service position to an emergency position for effecting a sudden reduction in brake pipe pressure and thereby initiating an emergency application of the brakes on the train.

The piston and auxiliary slide valve are so designed as to be moved to service position upon a small differential of pressures, such as .4 of a pound. In this position a spring comes into action which requires that the differential on the piston be increased a certain amount, such as .5 of a pound, before the piston can move the auxiliary slide valve to emergency position. In other words, a differential such as .9 of a pound is required on the emergency piston to move the auxiliary slide valve to emergency position.

Under all normal conditions of operation, the emergency portion of the brake equipment will operate in the manner and on substantially the pressure differentials above described. If, however, the resistance to movement of the piston should increase, due for instance to an accumulation of foreign matter around the piston or for any other reason, to such a degree as to require a differential of say .9 of a pound to start the piston moving, it is possible that even upon a service reduction in brake pipe pressure, the piston after it starts moving will move the auxiliary slide valve straight through service position to the emergency position and thereby initiate an undesired emergency application of the brakes on the train.

The principal object of the invention is to provide an improved emergency valve device or emergency portion for use with a brake controlling valve device such as above described, having means for obviating the possibility of obtaining an emergency application of the brakes upon a service reduction in brake pipe pressure.

According to the invention the auxiliary slide valve and thereby its functions are removed from the emergency portion above described, and a new valve device is added to the emergency portion. The new valve device comprises a slide valve having the functions of the auxiliary slide valve above described, and a flexible diaphragm subject to the opposing pressures of the brake pipe and quick action chamber is provided for operating the slide valve. Since a flexible diaphragm does not have sliding contact with a cylinder wall as does a piston, an accumulation of foreign matter or the like which would cause failure of a piston to operate on the pressure differential desired will have no appreciable effect upon the diaphragm, hence the diaphragm will always be operative by substantially the differential of pressures desired and thus obviate the possibility of obtaining an undesired emergency application of the brakes upon a service reduction in brake pipe pressure.

Other objects and advantages will be apparent from the following more detailed description of the invention.

In the accompanying drawing, the single figure is a diagrammatic view, mainly in section, of a portion of a fluid pressure brake equipment embodying the invention.

Figure 1:
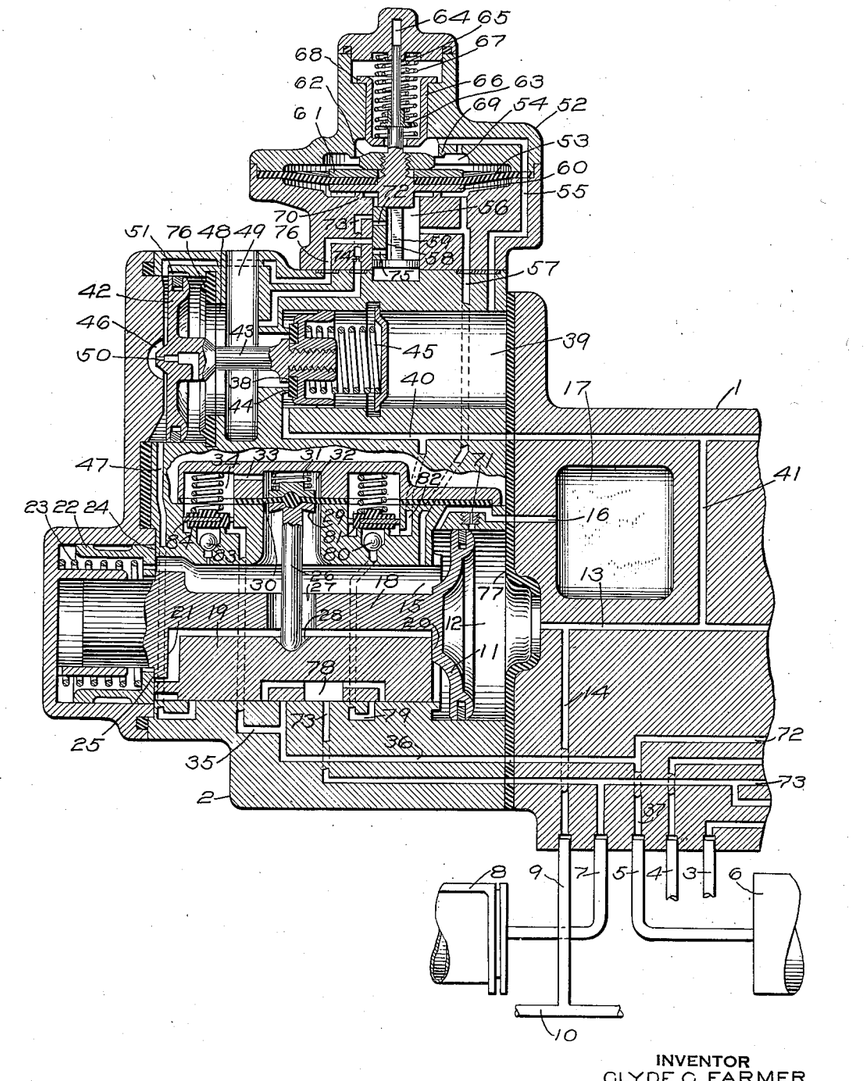

The portion of the fluid pressure brake equipment shown in the drawing is in general similar to the emergency portion of the equipment disclosed in the aforementioned pending application, only those parts being shown, however, which are deemed necessary to a clear understanding of the invention.

The portion of the fluid pressure brake equipment shown in the drawing comprises a pipe bracket 1 upon one face of which is mounted an emergency valve device 2. The pipe bracket 1 has another face (not shown) upon which is adapted to be mounted a service valve device (not shown), and the bracket is adapted to be connected by a pipe 3 to an auxiliary reservoir (not shown), by a pipe 4 to the usual pressure retaining valve device (not shown), by a pipe 5 to an emergency reservoir 6, by a pipe 7 to a brake cylinder 8 and by a pipe 9 to the usual brake pipe 10, in the same manner as disclosed in the aforementioned patent.

The emergency valve device 2 comprises a casing containing an emergency piston 11 having at one side a chamber 12 connected to the brake pipe 10 through passages 13 and 14 and pipe 9, and having at the opposite side a valve chamber 15 connected to a passage 16 which leads to a quick action chamber 17.

The piston 11 is provided with a stem 18 the end of which is slidably mounted in a suitable bore in the casing. A slide valve 19 is contained in the valve chamber 15 and is disposed between a shoulder 20 formed on the back of the piston 11 and a shoulder 21 formed on the stem 18 so as to be operated by said piston. The distance between the shoulders 20 and 21 is preferably, though not necessarily, somewhat greater than the length of the slide valve where adapted to be engaged by said shoulders to permit slight movement of the piston relative to the slide valve.

A movable stop 22 surrounding the end of the piston stem 18 is slidably mounted in the casing and is subject to the pressure of a spring 23 adapted to urge said stop into engagement with a shoulder 24 formed in the casing. This stop is provided with a central opening through which the piston stem 18 freely extends, said stem being provided with an annular shoulder 25 adapted to engage said stop.

A rocking pin 26 is provided for pressing the slide valve 19 against its seat. This pin extends through an opening 27 in the piston stem 18 so that one end engages the slide valve 19 in a recess 28. The other end of pin 26 is provided with a head 29 engaging one side of a flexible diaphragm 30. The diaphragm 30 is normally subject on the opposite side to the pressure of fluid and a spring 31 in a chamber 32 which is in permanent communication with the emergency reservoir 6 by way of passage 33, chamber 34, passages 35, 36 and 37 and pipe 5.

The emergency valve device 2 further comprises a brake pipe vent valve 38 contained in a chamber 39 which is connected to the brake pipe 10 by way of passages 40, 41, 13, and 14 and pipe 9. A piston 42 is connected to the vent valve 38 by a stem 43 and is operative to move said vent valve out of engagement with a seat rib 44. A spring 45 is provided in chamber 39 and acts on the vent valve 38 for urging same into sealing engagement with the seat rib 44.

The piston 42 is open at one side to a chamber 46 which is connected by a passage 47 to the seat of the slide valve 19 and at the opposite side to a chamber 48 which is open to the atmosphere through a passage 49. The piston 42 is provided with a restricted blow down timing port 50 connecting chambers 46 and 48 and a leakage groove 51 is provided in the casing to connect chambers 46 and 48 when said piston is in its normal position, as shown in the drawing.

According to the invention, no auxiliary slide valve is associated with the slide valve 19 as is the case in the aforementioned pending application, but the functions of said auxiliary slide valve are performed by a device 52 which is preferably associated with the emergency valve device 2.

The device 52 comprises a flexible diaphragm 53 having at one side a chamber 54 in constant communication with the brake pipe 10 by way of passage 55 and chamber 39 and at the opposite side a chamber 56 in constant communication through passage 57 with the emergency valve chamber 15 and hence with the quick action chamber 17 through passage 16.

A slide valve 58 is disposed in chamber 56 between spaced shoulders on a stem 59 which is secured to the flexible diaphragm 53 and which is adapted to be operated thereby for shifting said slide valve on its seat.

The stem 59 extends through the diaphragm 53 and is provided in chamber 56 with a follower plate 60 engaging one face of said diaphragm. A follower plate 61 is disposed over the stem 59 in engagement with the opposite face of said diaphragm, and a nut 62 having screw-threaded engagement with the stem is provided for clamping the follower plates 60 and 61 to the diaphragm.

Beyond the nut 62 the stem 59 is reduced in diameter to form a stop for a spring seat 63, the reduced portion of the stem extending into and having sliding contact with the wall of a bore 64 provided in the casing.

A service spring 65 is interposed between the spring seat 63 and the casing and is operative to bias the diaphragm 53 in a downward direction. Surrounding the service spring 65 is a movable cup-shaped stop 66 between which and the casing is interposed an emergency spring 67. The stop 66 is provided with an annular collar 68 adapted to engage a shoulder on the casing for defining the normal position of the inner end of the stop which is adapted to be engaged by the nut 62 to define the service position of the device.

An annular rib 69 on the casing extends into the chamber 54 and is adapted to be engaged by the follower plate 61 for limiting deflection of the diaphragm 53 in one direction and thus define one position of the slide valve 58. A stop rib 70 may be provided in chamber 56 to be engaged by the follower plate 60 for defining the normal position of the diaphragm 53 and valve 58, in which position these parts are shown in the drawing.

In operation, in order to initially charge the equipment with fluid under pressure, fluid under pressure is supplied to the brake pipe 10 in the usual well known manner and from thence flows through pipe 9 and passage 14 to passage 13 from whence it flows in a direction towards the left hand to the emergency piston chamber 12 and towards the right hand to the service portion of the equipment (not shown) and also to passage 41. Fluid under pressure supplied to passage 41 flows therefrom through passage 40 to the vent valve chamber 39 and from thence through passage 55 to diaphragm chamber 54.

With the parts of the emergency valve device 2 in their normal position, as shown in the drawing, fluid under pressure supplied to piston chamber 12 flows through a restricted charging port 71 to passage 16 and from thence in one direction to the quick action chamber 17 and in the opposite direction to the emergency valve chamber 15. From chamber 15 fluid under pressure flows through passage 57 to diaphragm chamber 56. In this manner the various chambers of the device are charged to the pressure carried in the brake pipe.

With the slide valve 19 in its normal position, as shown in the drawing, passage 47 is lapped thereby, so that the piston chamber 46 is at atmospheric pressure due to being open to the atmosphere through the port 50 and leakage groove 51. As a consequence, the spring 45 is permitted to hold the vent valve 38 in sealing engagement with the seat rib 44.

When the pressures in the diaphragm chambers 54 and 56 of the device 52 are equalized, the pressure of the service spring 65 acts to hold the diaphragm 53 and slide valve 58 in their normal position as defined by the engagement of the follower plate 60 with rib 70.

The emergency reservoir 6 is charged with fluid under pressure supplied to passage 72 by operation of the service portion of the equipment (not shown), while the brake cylinder 8 is normally vented to the atmosphere by way of passage 73 and through said service portion, in the same manner as described in the aforementioned pending application, which however forms no part of the invention.

If it is desired to effect a service application of the brakes, a service reduction in pressure in brake pipe 10 is effected in the usual well known manner, and this reduction is transmitted through passages 14 and 13 to the emergency piston chamber 12 and to the service portion (not shown) of the device, and from passage 13 through passages 41, 40, chamber 39 and passage 55 to diaphragm chamber 54.

The service portion (not shown) of the device operates upon a reduction in brake pipe pressure to supply fluid under pressure to the brake cylinder 8 for effecting an application of the brakes in the same manner as described in the aforementioned pending application.

Upon a reduction in pressure in the brake pipe and consequently in the emergency piston chamber 12 and diaphragm chamber 54, fluid under pressure in the quick action chamber 17 and connected valve chamber 15 and diaphragm chamber 56 commences to flow back to the emergency piston chamber 12 through the charging port 71, but this flow back is so restricted relative to the service rate of reduction in brake pipe pressure acting in chamber 54, that a sufficient differential of pressures is promptly obtained on the diaphragm 53 to deflect said diaphragm upwardly against the opposing pressure of spring 67 to service position defined by engagement of the nut 62 with the end of the stop 66.

This deflection of the diaphragm 53 moves the slide valve 58 to a position in which a port 72 therein registers with a passage 73 and through the communication thus established, fluid under pressure is vented from the quick action chamber 17, valve chamber 15 and diaphragm chamber 56 to the atmospheric passage 49 in the vent valve device and from thence to the atmosphere. This venting of fluid from chambers 15, 17 and 56 is adapted to reduce the pressure therein at as fast a rate as the pressure in chambers 12 and 54 reduces upon a service reduction in brake pipe pressure so as to prevent a sufficient differential of pressures being obtained on the emergency piston 11 to cause same to move the valve 19 from its normal position, and on the diaphragm 11 to cause it to continue movement past the service position against the opposing pressure of the emergency spring 67.

When the pressure in the quick action chamber 17, emergency valve chamber 15 and diaphragm chamber 56 is reduced, in the manner just described, sufficiently with respect to the opposing brake pipe pressure in chamber 54, the service spring 65 deflects the diaphragm 53 downwardly and thereby shifts the slide valve 58 back to its normal position thus limiting the reduction in pressure in these chambers to substantially that in the brake pipe.

It will be evident that regardless of the degree of reduction in brake pipe pressure or the number of stages in which a reduction in brake pipe pressure is made, the diaphragm 53 and valve 54 will operate to effect a corresponding reduction in pressure in the quick action chamber 17, valve chamber 15 and diaphragm chamber 56.

The diaphragm 53 is preferably made sufficiently large in area as to be very sensitive to slight pressure differentials that is, sufficiently large as to be deflected by a differential of pressures considerably less than obtained upon effecting a service reduction in brake pipe pressure. The service spring 65 is provided to act on the diaphragm with such force, added to the resistance of the diaphragm to deflection, as to prevent such deflection on a reduction in brake pipe pressure at less than a service rate, which may occur due to feed valve fluctuations on the locomotive. By this construction, any variations in the differential required to deflect the diaphragm by itself, such for instance as may be due to hardening or softening of the material in the diaphragm, will be only a small percentage of the total force required to move the diaphragm against the service spring and therefore, this construction may be depended upon to operate within a very small and permissible range either way of the exact differential desired.

Furthermore, the engagement of the nut 62 with the movable spring pressed stop 66 in service position acts to prevent the valve 58 from overtraveling the service position, due for instance to inertia of the moving parts, thereby rendering said diaphragm and slide valve positive in their service operation.

If the emergency piston 11 is sufficiently free in its bore, it may respond to a service reduction in brake pipe pressure and move towards the right hand until shoulder 21 engages the end of the slide valve 19 which, however, is designed to have such resistance to movement as to stop the piston from moving further upon a service reduction in brake pipe pressure.

This movement of the piston 11 relative to the slide valve 19 upon a service reduction in brake pipe pressure is desirable in that it will tend to keep the piston free in its bore and thereby render it somewhat more sensitive to an emergency reduction in brake pipe pressure. This relative movement closes communication between the charging port 71 and piston chamber 12 as is desirable, but not essential, in effecting an emergency application of the brakes, as will be hereinafter described.

It will be noted that the flexible diaphragm 53 is of greater diameter than the emergency piston 11 while the slide valve 58, which is adapted to be moved by said diaphragm, is smaller than the emergency slide valve 19 which the emergency piston 11 has to move. In other words the parts of the device are so proportioned as to ensure their operation in the manner above described upon a service reduction in brake pipe pressure.

In order to effect a release of the brakes after a service reduction in brake pipe pressure, the brake pipe pressure is increased in the usual manner. Fluid under pressure then flows from the brake pipe to the service portion (not shown) of the device which operates to release fluid under pressure from the brake cylinder 8 in the manner described in the aforementioned pending application. Fluid under pressure is also supplied from the brake pipe to the emergency valve device 2 and the device 52 and these devices become conditioned in the same manner as in initially charging the equipment.

If it is desired to effect an emergency application of the brakes, a sudden reduction in brake pipe pressure is initiated by the brake valve device or other suitable means in the usual manner. The diaphragm 53 responds to the sudden reduction in brake pipe pressure in chamber 54 and moves to service position in which fluid under pressure is vented from diaphragm chamber 56 through port 72, and passage 73 to the atmosphere. This venting is so restricted by a choke 74 in passage 73 that the pressure in chamber 56 is not able to reduce as fast as the brake pipe pressure in chamber 54 is reducing, and consequently the differential of pressures on the diaphragm 53 quickly increases to a degree sufficient to overcome the pressure of spring 67 on the movable stop 66. The diaphragm 53 then deflects to emergency position defined by the engagement of the follower plate 61 with the stop rib 69. It is desired to point out that the differential required to deflect the diaphragm 53 to emergency position is so quickly obtained upon an emergency reduction in brake pipe pressure that there will be no perceptible hesitation of said diaphragm in the service position during the movement to emergency position.

This deflection of the diaphragm 53 moves the slide valve 58 past service position to emergency position in which a port 75 in the slide valve registers with a passage 76 leading to the vent valve piston chamber 46. Through this communication fluid under pressure is supplied from the quick action chamber 17, valve chamber 15 and diaphragm chamber 56 to chamber 46 at a rate exceeding the venting capacity of leakage groove 51 and the restricted port 50, so that a fluid pressure is promptly built up in chamber 46 which overcomes the brake pipe pressure plus that of spring 45 acting to seat the vent valve 38. As a result, the piston 42 is moved into sealing engagement with a gasket 76 and in so doing shifts the vent valve away from the seat rib 44.

The unseating of the brake pipe vent valve 38 permits fluid under pressure to rapidly flow from brake pipe 10 to the atmosphere through pipe 9, passages 14, 13, 41, 40, chamber 39, past the valve 38 and from thence through the passage 49 to the atmosphere. The resultant sudden reduction in brake pipe pressure effects the operation of the valve device 52 on the adjacent car and in this manner quick emergency action is rapidly transmitted serially from car to car throughout the train.

The emergency piston 11 may move upon the initiation of the reduction in brake pipe pressure to the position in which shoulder 21 on the stem engages the slide valve 19. Whether this occurs or not, when the brake pipe pressure in chamber 12 becomes sufficiently reduced, the opposing quick action chamber pressure in valve chamber 15 moves the piston 11 and thereby the slide valve 19 to emergency position as defined by the engagement of said piston with a gasket 77.

In this position of the slide valve 19, a cavity 78 therein connects the emergency reservoir passage 36 to the brake cylinder passage 73 which permits fluid under pressure to equalize from the emergency reservoir 6 into the brake cylinder 8. It will of course be understood that the service portion (not shown) of the device operates to supply fluid under pressure to the brake cylinder 8 in the manner described in the aforementioned pending application, and that the supply from the emergency reservoir to the brake cylinder is intended to provide the high emergency brake cylinder pressure desired.

In emergency position of slide valve 19, passage 47 is uncovered by the left hand end of said valve and thus opened to valve chamber 15 and through this communication fluid under pressure is adapted to flow from the quick action chamber to the piston chamber 46, as well as by way of the device 52.

Fluid thus supplied to the piston chamber 46 is gradually vented to the atmosphere through the port 50 in piston 42 to chamber 48 and from thence through the atmospheric passage 49.

When the quick action chamber pressure acting in diaphragm chamber 56 on diaphragm 53 becomes reduced by flow through the port 50 to a degree less than the opposing force of the emergency spring 67, said spring deflects said diaphragm and consequently moves the slide valve 58 to service position, and then upon a still further reduction in pressure in chamber 56, the service spring 65 deflects said diaphragm and consequently moves said slide valve back to the normal position. This operation of the valve device 52 does not however, cut off the supply of fluid under pressure to the piston chamber 46 since such supply is maintained through passage 47 from the valve chamber 15.

The port 50 is so proportioned to the combined volumes of the quick action chamber 17, emergency valve chamber 15 and diaphragm chamber 56, that fluid under pressure from said chambers will maintain sufficient pressure on the piston 42 to hold the vent valve 38 open for a predetermined period of time sufficient to ensure complete venting of fluid under pressure from the brake pipe. At the expiration of this period of time, or when the pressure in chamber 46 becomes sufficiently reduced, spring 45 acts to seat the vent valve so that the brake equipment may be recharged to effect a release of the brakes whenever it is so desired. As the vent valve 38 is seated, the piston 42 is returned to its normal position in which the chamber 46 is additionally vented to the atmosphere through the leakage groove 51 and through this groove and the port 50 any fluid under pressure remaining in the quick action chamber 17 and the chambers 14 and 56 is dissipated.

It will be evident that if the emergency piston 11 is sufficiently free in its bore to respond to the emergency reduction in brake pipe pressure immediately after being initiated, it prevents back flow of fluid from the quick action chamber to the brake pipe thereby preventing the loss of fluid under pressure which it is desired be employed in holding the vent valve 38 open the predetermined period of time above described. If the piston 11 fails to thus operate however, the sudden venting of fluid under pressure from the brake pipe by the operation of the vent valve 38 provides a sufficient differential of pressures on said piston to ensure the operation thereof to move the slide valve 19 to emergency position and at the same time close communication through the feed port 71 to the brake pipe.

In effecting an emergency application of the brakes on a train it is first desirable to suddenly vent fluid under pressure from the brake pipe as quickly as possible and it will be noted that this is accomplished by the device 52 on each car of the train which will operate on a small differential of pressures obtained upon initiating an emergency reduction in brake pipe pressure. This device 52 will operate at all times as intended since it is controlled by a flexible diaphragm of relatively large area as compared to that of the seating face of the slide valve 58, and the flexible diaphragm can itself be depended upon to respond to the differential of pressures desired regardless of changes in the internal resistance of the diaphragm or of such accumulations of foreign matter around the diaphragm as will be encountered in service. It will be evident that the sudden venting of fluid under pressure from the brake pipe is not dependent upon the operation of the piston 11, but this sudden venting of the brake pipe will ensure a sufficient differential on said piston to cause same to operate, that is, if said piston does not move the slide valve 19 to emergency position when a differential of say three pounds is obtained thereon, the differential will be increased to many times the three pounds or until sufficient is obtained to overcome the static resistance to movement of the piston 11 and/or the slide valve 19 and thus cause same to move to their emergency position.

In order to effect a release of the brakes after an emergency application, fluid under pressure is supplied to the brake pipe 10 and from thence flows to the emergency piston chamber 12 and to the diaphragm chamber 54.

Adjacent the locomotive of the train this increase in brake pipe pressure is initially rapid and promptly provides sufficient differential of pressures on the emergency piston 11 to move said piston away from the gasket 77 into engagement with the slide valve 19 and then moves said slide valve back to the normal position as defined by the engagement of shoulder 25 on the piston stem 18 with the movable stop 22. In this position the port 71 is open but its flow capacity is so restricted, that the differential of pressures on the piston 11 promptly increases to a degree sufficient to overcome the pressure of spring 23 on the movable stop 22 whereupon, the piston moves the stop 22 and consequently the slide valve 19 to a back dump position as defined by the engagement of said piston with the casing.

In this back dump position, the cavity 78 connects the brake cylinder passage 73 to a passage 79 which permits fluid under pressure to flow from the brake cylinder 8 back into the brake pipe 10 by way of pipe 7, passage 73, cavity 78, passage 79, past two serially arranged check valves 80 and 81, passages 82, 40, 41, 13, 14, and pipe 9. Fluid under pressure from the brake cylinder 8 is thus permitted to substantially equalize into the brake pipe, and at this time the auxiliary reservoir (not shown) is in communication with the brake cylinder through the service portion (not shown) of the device so that fluid under pressure therein also equalizes back into the brake pipe 10 as fully described in the aforementioned pending application.

This back dumping of fluid into the brake pipe 10 effects a sudden local increase in brake pipe pressure and causes the operation of the emergency valve device on the adjacent car to cause like back dump operation, and in this manner this back dump operation is serially transmitted from car to car throughout a train which results in a rapid increase in brake pipe pressure.

After the back dump operation, fluid under pressure supplied to the brake pipe at the locomotive continues to increase the pressure in the brake pipe until eventually the service portion of the equipment operates to release fluid under pressure from the brake cylinder thereby releasing the brakes as described in the aforementioned pending application.

In the emergency valve device 2, fluid under pressure from the piston chamber 12 flows through the port 71 to the emergency valve chamber 15, the quick action chamber 17 and diaphragm chamber 56. When the pressure in the emergency valve chamber 15 is thus increased sufficiently the pressure of spring 23 on the stop 22 moves said stop and thereby the piston 11 and slide valve 19 back to their normal position, as shown in the drawing, following which the equipment becomes charged to the pressure carried in the brake pipe in the same manner as described in connection with the initial charging of the equipment.

It will be evident that since both diaphragm chambers 54 and 56 are completely vented in effecting an emergency application of the brakes which permits spring 65 to deflect the diaphragm 53 into engagement with stop rib 70, and further since upon effecting a release of the brakes after an emergency application the pressure in the brake pipe chamber 54 is increased ahead of the pressure in chamber 56, the device 52 does not move upon effecting a release of the brakes.

If for any reason the pressure in the emergency valve chamber 15 should increase above that in the emergency reservoir 6 while effecting a release of the brakes, this pressure acts to unseat the check valves 83 and 84 and be thus dissipated into the emergency reservoir 6 which is of relatively large volume and thus able to prevent the chamber 15 from becoming charged to a pressure exceeding substantially that normally carried in the brake pipe.

It will be noted that in effecting an emergency application of the brakes, the lost motion between the piston 11 and slide valve 19 permits the piston to move first relatively to the valve, and also in effecting a release of the brakes after an emergency application said lost motion permits the piston 11 to first move away from the gasket 77 and then pick up said slide valve. This is desirable because it permits the piston to be free in its bore before picking up the slide valve which better ensures the slide valve being operated on the differential desired, and it is particularly desirable in releasing the brakes after an emergency application in that it permits the piston to more readily move out of sealing engagement with the gasket 77 and thereby become exposed over its full area to brake pipe pressure which ensures more prompt movement of the slide valve to back dump position and thereby accelerates the release of the brakes.

It will now be noted that in accordance with the invention, a device is provided which will operate to prevent an undesired emergency application of the brakes upon a service reduction in brake pipe pressure, and which will respond to an emergency reduction in brake pipe pressure to provide the desired rapid serial venting of fluid under pressure from the brake pipe for effecting an emergency application of the brakes on a train, and it will be further noted that this device will operate upon substantially the pressure differentials desired since its operation is substantially independent of foreign matter which may accumulate in the equipment and substantially independent of changes in the physical condition of the device.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, in combination, a brake pipe, a quick action chamber, a movable abutment subject to the opposing pressures of said brake pipe and chamber, a valve movable by said abutment upon a reduction in brake pipe pressure to either a service or an emergency position according to the rate of said reduction, means operative in service position of said valve to reduce the pressure in said chamber at a service rate, spring means operative only to oppose movement of said valve past service position to emergency position, and other spring means operative to oppose the initial movement of said valve upon a reduction in brake pipe pressure at a rate less than a service rate.

2. In a fluid pressure brake, in combination, a brake pipe, a quick action chamber, a movable abutment subject to the opposing pressures of said brake pipe and chamber, a valve movable by said abutment upon a reduction in brake pipe pressure from a normal position to either a service or an emergency position according to the rate of said reduction, means operative only to prevent movement of said valve to emergency position upon a service reduction in brake pipe pressure, and spring means operative to prevent movement of said valve from normal position upon a reduction in brake pipe pressure at a rate less than a service rate.

3. In a fluid pressure brake, in combination, a brake pipe, a quick action chamber in communication with said brake pipe through a restricted port, a valve having a service position for venting fluid under pressure from said chamber at a rate corresponding to a service rate of reduction in brake pipe pressure and having an emergency position, a movable abutment subject to the opposing pressures of said brake pipe and chamber and operative by the differential established between said opposing pressures upon a service reduction in brake pipe pressure to move said valve to said service position and by the differential established upon an emergency reduction in brake pipe pressure to move said valve to emergency position, spring means acting on said abutment whereby a predetermined differential of pressures is required to initially actuate said abutment to thereby move said valve to service position, and other spring means operative to act on said abutment only after movement of said valve to service position whereby an increase in the differential of pressures is required to actuate said abutment so as to move the said valve to emergency position.

4. In a fluid pressure brake, in combination, a brake pipe, a quick action chamber in communication with said brake pipe through a restricted port, a valve having a service position for venting fluid under pressure from said chamber at a rate corresponding to a service rate of reduction in brake pipe pressure and having an emergency position, a movable abutment subject to the opposing pressures of said brake pipe and chamber and operative by the differential established between said opposing pressures upon a service reduction in brake pipe pressure to move said valve to said service position and by the differential established upon an emergency reduction in brake pipe pressure to move said valve to emergency position, spring means operative to define said service position and the differential of pressures required on said abutment for moving said valve to said emergency position, and other spring means constantly acting on said abutment and operative to define the differential of pressures required on said abutment for moving said valve to service position.

5. In a fluid pressure brake, in combination, a brake pipe, a quick action chamber, a brake pipe vent valve device operative to effect sudden venting of fluid under pressure from said brake pipe, a flexible diaphragm subject to the opposing pressures of said brake pipe and chamber, a valve movable by said diaphragm to an emergency position upon an emergency reduction in brake pipe pressure for effecting the operation of said vent valve device, valve means for effecting an emergency application of the brakes, and a piston subject to the opposing pressures of said brake pipe and chamber and operative upon sudden venting of fluid under pressure from the brake pipe for effecting the operation of said valve means.

6. In a fluid pressure brake, in combination, a brake pipe, a quick action chamber, a brake pipe vent valve device operative to effect sudden venting of fluid under pressure from said brake pipe, a flexible diaphragm subject to the opposing pressures of said brake pipe and chamber, a valve movable by said diaphragm to an emergency position upon an emergency reduction in brake pipe pressure for supplying fluid under pressure for effecting the operation of said vent valve device, valve means for effecting an emergency application of the brakes and for also supplying fluid under pressure to said vent valve device to effect the operation thereof, and a piston controlled by the opposing pressures of said brake pipe and chamber and operative upon sudden venting of fluid under pressure from the brake pipe for operating said valve means.

7. In a fluid pressure brake, in combination, a brake pipe, a quick action chamber, a brake pipe vent valve device operative by fluid under pressure to effect sudden venting of fluid under pressure from said brake pipe, a flexible diaphragm subject to the opposing pressures of said brake pipe and chamber, a valve movable by said diaphragm to an emergency position upon an emergency reduction in brake pipe pressure for supplying fluid under pressure from said chamber to said vent valve device, valve means for effecting an emergency application of the brakes and for also supplying fluid under pressure from said chamber to said vent valve device, and a piston controlled by the opposing pressures of said brake pipe and chamber and operative upon sudden venting of fluid under pressure from the brake pipe for operating said valve means.

8. In a fluid pressure brake, in combination, a brake pipe, a quick action chamber, a brake pipe vent valve device operative by fluid under pressure to effect sudden venting of fluid under pressure from said brake pipe, a flexible diaphragm subject to the opposing pressures of said brake pipe and chamber, a valve movable by said diaphragm to an emergency position upon an emergency reduction in brake pipe pressure for supplying fluid under pressure from said chamber to operate said vent valve device, valve means for effecting an emergency application of the brakes and for also supplying fluid under pressure from said chamber to operate said vent valve device, means for gradually venting the fluid supplied to said vent valve device and thereby the fluid under pressure from said quick action chamber, and a piston controlled by the opposing pressures of said brake pipe and chamber and operative upon sudden venting of fluid under pressure from the brake pipe for operating said valve means.

9. In a fluid pressure brake, in combination, a brake pipe, a quick action chamber, a valve operative to effect an emergency application of the brakes, a piston subject to the opposing pressures of said brake pipe and chamber and operative when a predetermined differential is established between the pressures in said brake pipe and chamber upon a reduction in brake pipe pressure to effect the operation of said valve, another valve movable to a service position upon a service rate of reduction in brake pipe pressure to open a communication to reduce the pressure in said chamber at a corresponding rate and movable to an emergency position upon an emergency reduction in brake pipe pressure to open another communication to effect said predetermined differential of pressures, and a flexible diaphragm subject to the opposing pressures of said brake pipe and chamber and operative upon a reduction in brake pipe pressure to move said other valve to either said service position or emergency position according to the rate of said reduction in brake pipe pressure.

10. In a fluid pressure brake, in combination, a brake pipe, a quick action chamber, a valve operative to effect an emergency application of the brakes, a piston subject to the opposing pressures of said brake pipe and chamber and operative when a predetermined differential is established between the pressures in said brake pipe and chamber upon a reduction in brake pipe pressure to effect the operation of said valve, another valve movable to a service position upon a service rate of reduction in brake pipe pressure to reduce the pressure in said chamber at a corresponding rate and movable to an emergency position upon an emergency reduction in brake pipe pressure to effect said predetermined differential of pressures, a flexible diaphragm subject to the opposing pressures of said brake pipe and chamber and operative to move said valve to either said service position or said emergency position according to the rate of reduction in brake pipe pressure, a spring acting on said diaphragm for preventing movement thereof upon a reduction in brake pipe pressure at a rate less than a service rate, and another spring adapted to act on said diaphragm in service position of said other valve for defining said service position.

11. In a fluid pressure brake, in combination, a brake pipe, a quick action chamber, a valve operative to effect an emergency application of the brakes, a piston subject to the opposing pressures of said brake pipe and chamber for operating said valve, valve means movable to a service position for establishing a communication for venting fluid under pressure from said chamber at a service rate to prevent operation of said piston upon a service rate of reduction in brake pipe pressure and movable to an emergency position upon an emergency reduction in brake pipe pressure for establishing another communication to effect a sufficient reduction in brake pipe pressure to cause said piston to operate said valve, and a flexible diaphragm subject to the opposing pressures of said brake pipe and chamber and operative to effect movement of said valve means to either said service position or said emergency position in accordance with the rate of reduction in brake pipe pressure.

12. In a fluid pressure brake, in combination, a brake pipe, a brake pipe vent valve device operative to effect a sudden venting of fluid under pressure from said brake pipe, a quick action chamber, an emergency slide valve movable to a position for venting fluid under pressure from said quick action chamber to said vent valve device for effecting the operation thereof and also operative in said position to effect an emergency application of the brakes, a piston subject to the opposing pressures of said brake pipe and chamber and operative upon a reduction in brake pipe pressure when a predetermined differential is established between the pressures in said brake pipe and chamber to move said slide valve to said position, a valve operative upon a service rate of reduction in brake pipe pressure to effect a corresponding rate of reduction in pressure in said chamber to prevent obtaining said predetermined differential of pressures and operative upon an emergency rate of reduction in brake pipe pressure to effect the operation of said vent valve device to establish said predetermined differential of pressures, and a flexible diaphragm subject to the opposing pressures of said brake pipe and chamber and operative to effect the operation of said valve in accordance with the rate of reduction in brake pipe pressure.

13. In a fluid pressure brake, in combination, a brake pipe, a brake pipe vent valve device operative to effect a sudden venting of fluid under pressure from said brake pipe, a quick action chamber, an emergency slide valve movable to a position for venting fluid under pressure from said quick action chamber to said vent valve device for effecting the operation thereof and also operative in said position to effect an emergency application of the brakes, a piston subject to the opposing pressures of said brake pipe and chamber and operative upon a reduction in brake pipe pressure when a predetermined differential is established between the pressures in said brake pipe and chamber to move said slide valve to said position, a valve operative upon a service rate of reduction in brake pipe pressure to effect a corresponding rate of reduction in pressure in said chamber to prevent obtaining said predetermined differential of pressures and operative upon an emergency rate of reduction in brake pipe pressure to effect the operation of said vent valve device to establish said predetermined differential of pressures, a flexible diaphragm subject to the opposing pressures of said brake pipe and chamber and operative upon a reduction in brake pipe pressure to effect the operation of said valve in accordance with the rate of said reduction, a spring for preventing movement of said diaphragm upon a reduction in brake pipe pressure at a rate less than a service rate, and another spring operative to define the position of said valve for effecting a service reduction in pressure in said chamber.

14. In a fluid pressure brake, in combination, a brake pipe, a brake pipe vent valve device operative to effect sudden venting of fluid under pressure from said brake pipe, a quick action chamber, valve means operative upon a service rate of reduction in brake pipe pressure to effect a corresponding rate of reduction in pressure in said chamber and upon an emergency rate of reduction in brake pipe pressure to supply fluid under pressure from said chamber for effecting the operation of said vent valve device, a valve operative to supply fluid under pressure from said chamber to said vent valve device for also effecting the operation thereof and for at the same time effecting an emergency application of the brakes, a piston subject to the opposing pressures of said brake pipe and chamber and operative upon sudden venting of fluid under pressure from said brake pipe to effect the operation of said valve, and a flexible diaphragm also subject to the opposing pressures of said brake pipe and chamber and operative to operate said valve means in accordance with the rate of reduction in brake pipe pressure.

15. In a fluid pressure brake, in combination, a brake pipe, a brake pipe vent valve device operative to effect sudden venting of fluid under pressure from said brake pipe, a quick action chamber, valve means operative upon a service rate of reduction in brake pipe pressure to effect a corresponding rate of reduction in pressure in said chamber and upon an emergency rate of reduction in brake pipe pressure to supply fluid under pressure from said chamber for effecting the operation of said vent valve device, a valve operative to supply fluid under pressure from said chamber to said vent valve device for also effecting the operation thereof and for at the same time effecting an emergency application of the brakes, a piston subject to the opposing pressures of said brake pipe and chamber and operative upon sudden venting of fluid under pressure from said brake pipe to effect the operation of said valve, a flexible diaphragm also subject to the opposing pressures of said chamber and operative to operate said valve means in accordance with the rate of reduction in brake pipe pressure, a spring acting on said diaphragm for preventing operation thereof upon a reduction in brake pipe pressure at a rate less than a service rate, and another spring operative to define the position of said valve means for effecting a service reduction in pressure in said chamber and for opposing movement of said valve means to the position for supplying fluid under pressure from said chamber to effect operation of said vent valve device, said springs being operative when the pressure in said chamber is reduced below the opposing pressure of said springs to operate said valve means to close the communication controlled thereby from said chamber to said vent valve device.

16. In a fluid pressure brake, in combination, a brake pipe, a brake pipe vent valve device operative to effect sudden venting of fluid under pressure from said brake pipe, a quick action chamber, valve means operative to effect an emergency application of brakes, a piston subject to the opposing pressures of said brake pipe and chamber and operative when a predetermined differential of pressures is established between said brake pipe and chamber upon a reduction in brake pipe pressure to operate said valve means, a flexible diaphragm subject to the opposing pressures of said brake pipe and chamber, and a valve device independent of said valve means operative by said diaphragm upon a service rate of reduction in brake pipe pressure to effect a corresponding rate of reduction in pressure in said chamber for preventing movement of said piston and thereby said valve means upon a service reduction in brake pipe pressure, and operative upon an emergency reduction in brake pipe pressure to effect operation of said brake pipe vent valve device to provide said predetermined differential of fluid pressures.

17. In a fluid pressure brake, in combination, a brake pipe, a quick action chamber, valve means operative to effect an emergency application of the brakes, a piston subject to the opposing pressures of said brake pipe and chamber and operative when a predetermined differential is obtained between the pressures in said brake pipe and chamber upon a reduction in brake pipe pressure to operate said valve means, a brake pipe vent valve device operative to effect sudden venting of fluid under pressure from said brake pipe to provide said predetermined differential of pressures, a valve operative upon a service rate of reduction in brake pipe pressure to reduce the pressure in said chamber at a corresponding rate and upon an emergency rate of reduction in brake pipe pressure to effect the operation of said brake pipe vent valve device, and a flexible diaphragm of greater area than said piston and subject to the opposing pressures of said brake pipe and chamber for operating said valve.

18. In a fluid pressure brake, in combination, a brake pipe, a quick action chamber, a brake pipe vent valve device operative to effect a sudden reduction in brake pipe pressure, a piston subject to the opposing pressures of said brake pipe and chamber, valve means operated by said piston upon a sudden reduction in brake pipe pressure to supply fluid under pressure from said quick action chamber to operate said vent valve device and to also effect an emergency application of the brakes, a flexible diaphragm of larger area than said piston and subject to the opposing pressures of said brake pipe and chamber, and valve means operative by said diaphragm upon a service rate of reduction in brake pipe pressure to reduce the pressure in said chamber at a corresponding rate and upon an emergency reduction in brake pipe pressure to supply fluid under pressure to said vent valve device for effecting the operation thereof.

19. In a fluid pressure brake, in combination, a brake pipe, a quick action chamber, a brake pipe vent valve device operative to effect a sudden reduction in brake pipe pressure, a piston subject to the opposing pressures of said brake pipe and chamber, valve means operated by said piston upon a sudden reduction in brake pipe pressure to supply fluid under pressure from said quick action chamber to operate said vent valve device and to also effect an emergency application of the brakes, a flexible diaphragm of larger area than said piston and subject to the opposing pressures of said brake pipe and chamber, valve means operative by said diaphragm upon a service rate of reduction in brake pipe pressure to reduce the pressure in said chamber at a corresponding rate and upon an emergency reduction in brake pipe pressure to supply fluid under pressure to said vent valve device for effecting the operation thereof, and a spring acting on said diaphragm for preventing operation thereof upon a reduction in brake pipe pressure at a rate less than a service rate.

20. In a fluid pressure brake, in combination, a brake pipe and an emergency valve device comprising a brake pipe vent valve device operative to effect an emergency reduction in brake pipe pressure, a slide valve having a normal position and movable therefrom to another position for effecting an emergency application of brakes and for supplying fluid under pressure from a quick action chamber to said vent valve device for effecting the operation thereof, a piston subject to the opposing pressures of said brake pipe and chamber and operative upon an emergency reduction in brake pipe pressure to move said valve from said normal position to said other position, another slide valve having a normal position and movable therefrom to a service position for reducing the pressure in said chamber at a rate corresponding to a service rate of reduction in brake pipe pressure, and movable further to an emergency position for supplying fluid under pressure from said chamber to said vent valve device for effecting the operation thereof, and a movable abutment operative to move said other slide valve to service position upon a service reduction in brake pipe pressure and to emergency position upon an emergency reduction in brake pipe pressure, the area of said movable abutment being so proportioned to the size of the slide valve operative thereby as to move same upon a less differential between brake pipe and quick action chamber pressures than required on said piston to move its slide valve.

21. In a fluid pressure brake, in combination, a brake pipe and an emergency valve device comprising a brake pipe vent valve device operative to effect an emergency reduction in brake pipe pressure, a slide valve having a normal position and movable therefrom to another position for effecting an emergency application of brakes and for supplying fluid under pressure from a quick action chamber to said vent valve device for effecting the operation thereof, a piston subject to the opposing pressures of said brake pipe and chamber and operative upon an emergency reduction in brake pipe pressure to move said valve from said normal position to said other position, another slide valve having a normal position and movable therefrom to a service position for reducing the pressure in said chamber at a rate corresponding to a service rate of reduction in brake pipe pressure, and movable further to an emergency position for supplying fluid under pressure from said chamber to said vent valve device for effecting the operation thereof, and a flexible diaphragm subject to the opposing pressures of said brake pipe and chamber and operative upon a service reduction in brake pipe pressure to move said other slide valve to service position and upon an emergency reduction in brake pipe pressure to move said other slide valve to emergency position.

22. In a fluid pressure brake, in combination, a brake pipe and an emergency valve device comprising a brake pipe vent valve device operative to effect an emergency reduction in brake pipe pressure, a slide valve having a normal position and movable therefrom to another position for effecting an emergency application of brakes and for supplying fluid under pressure from a quick action chamber to said vent valve device for effecting the operation thereof, a piston subject to the opposing pressures of said brake pipe and chamber and operative upon an emergency reduction in brake pipe pressure to move said valve from said normal position to said other position, another slide valve having a normal position and movable therefrom to a service position for reducing the pressure in said chamber at a rate corresponding to a service rate of reduction in brake pipe pressure, and movable further to an emergency position for supplying fluid under pressure from said chamber to said vent valve device for effecting the operation thereof, and a flexible diaphragm subject to the opposing pressures of said brake pipe and chamber and operative upon a service reduction in brake pipe pressure to move said other slide valve to service position and upon an emergency reduction in brake pipe pressure to move said other slide valve to emergency position, said diaphragm being of relatively large area with respect to the force required to move its slide valve as compared to the area of said piston with respect to the force required to move its slide valve.

23. In a fluid pressure brake, in combination, a brake pipe and an emergency valve device comprising a brake pipe vent valve device operative to effect an emergency reduction in brake pipe pressure, a slide valve having a normal position and movable therefrom to another position for effecting an emergency application of brakes and for supplying fluid under pressure from a quick action chamber to said vent valve device for effecting the operation thereof, a piston subject to the opposing pressures of said brake pipe and chamber and operative upon an emergency reduction in brake pipe pressure to move said valve from said normal position to said other position, another slide valve having a normal position and movable therefrom to a service position for reducing the pressure in said chamber at a rate corresponding to a service rate of reduction in brake pipe pressure, and movable further to an emergency position for supplying fluid under pressure from said chamber to said vent valve device for effecting the operation thereof, and a flexible diaphragm subject to the opposing pressures of said brake pipe and chamber and operative upon a service reduction in brake pipe pressure to move said other slide valve to service position and upon an emergency reduction in brake pipe pressure to move said other slide valve to emergency position, said diaphragm being of such area with respect to the force required to move said other slide valve as to be able to move same upon a differential between brake pipe and quick action chamber pressures less than obtained upon a service reduction in brake pipe pressure, and a spring acting on said diaphragm to prevent movement thereof upon a reduction in brake pipe pressure at a rate less than a service rate.

24. In a fluid pressure brake, in combination, a brake pipe and an emergency valve device comprising a brake pipe vent valve device operative to effect an emergency reduction in brake pipe pressure, a slide valve having a normal position and movable therefrom to another position for effecting an emergency application of brakes and for supplying fluid under pressure from a quick action chamber to said vent valve device for effecting the operation thereof, a piston subject to the opposing pressures of said brake pipe and chamber and operative upon an emergency reduction in brake pipe pressure to move said valve from said normal position to said other position, another slide valve having a normal position and movable therefrom to a service position for reducing the pressure in said chamber at a rate corresponding to a service rate of reduction in brake pipe pressure, and movable further to an emergency position for supplying fluid under pressure from said chamber to said vent valve device for effecting the operation thereof, and a flexible diaphragm subject to the opposing pressures of said brake pipe and chamber and operative upon a service reduction in brake pipe pressure to move said other slide valve to service position and upon an emergency reduction in brake pipe pressure to move said other slide valve to emergency position, said diaphragm being of such area with respect to the force required to move said other slide valve as to be able to move same upon a differential between brake pipe and quick action chamber pressures less than obtained upon a service reduction in brake pipe pressure, a spring acting on said diaphragm to prevent movement thereof upon a reduction in brake pipe pressure at a rate less than a service rate, and another spring adapted to define said service position and oppose movement of said diaphragm and its slide valve past service position to emergency position.

CLYDE C. FARMER.